United States Patent
Drinkwater et al.

(10) Patent No.: US 6,822,769 B1
(45) Date of Patent: Nov. 23, 2004

(54) SECURITY DEVICE

(75) Inventors: Kenneth John Drinkwater, Surrey (GB); Brian William Holmes, Middlesex (GB)

(73) Assignee: De la Rue International Limited, Basingstoke (GB)

( * ) Notice: Subject to any disclaimer, the term of this patent is extended or adjusted under 35 U.S.C. 154(b) by 0 days.

(21) Appl. No.: 09/979,269

(22) PCT Filed: May 30, 2000

(86) PCT No.: PCT/GB00/02081

§ 371 (c)(1),
(2), (4) Date: Nov. 26, 2001

(87) PCT Pub. No.: WO00/73991

PCT Pub. Date: Dec. 7, 2000

(30) Foreign Application Priority Data

Jun. 1, 1999 (GB) .............................. 9912723
Jun. 14, 1999 (GB) .............................. 9913768

(51) Int. Cl.[7] .............................. G03H 1/00; G03H 1/28; B42D 15/10
(52) U.S. Cl. .............................. 359/2; 359/24; 283/86
(58) Field of Search .......................... 359/2, 24; 283/86

(56) References Cited

U.S. PATENT DOCUMENTS

| | | | |
|---|---|---|---|
| 3,708,214 A | | 1/1973 | McMahon |
| 4,129,382 A | | 12/1978 | Greenaway |
| 4,143,810 A | | 3/1979 | Greenaway |
| 4,163,570 A | | 8/1979 | Greenaway |
| 4,211,918 A | | 7/1980 | Nyfeler et al. |
| 4,501,439 A | | 2/1985 | Antes |
| 4,568,141 A | * | 2/1986 | Antes .............................. 359/2 |
| 4,761,543 A | | 8/1988 | Hayden |
| 5,059,776 A | | 10/1991 | Antes |
| 5,379,131 A | * | 1/1995 | Yamazaki ....................... 359/2 |
| 5,483,363 A | | 1/1996 | Holmes et al. |
| 5,486,933 A | * | 1/1996 | Shindo et al. .................. 359/2 |
| 5,623,347 A | | 4/1997 | Pizzanelli |
| 5,825,475 A | | 10/1998 | Formosa ......................... 359/2 |
| 5,886,798 A | * | 3/1999 | Staub et al. .................... 359/2 |
| 6,025,938 A | | 2/2000 | Kathman et al. |

FOREIGN PATENT DOCUMENTS

| | | |
|---|---|---|
| DE | 43 01 186 A1 | 7/1994 |
| EP | 0 304 194 A2 | 2/1989 |
| GB | 2 149 532 A | 6/1985 |
| GB | 2 221 550 A | 2/1990 |
| WO | WO 92/04692 | 3/1992 |
| WO | WO 92/09444 | 6/1992 |
| WO | WO 99/59036 | * 11/1999 |

OTHER PUBLICATIONS

Drinkwater, John et al., Multiplex Holography For The Display Of Three–Dimensional Information; Progress in Holography; vol. 812, pp. 128–134 (1987).

(List continued on next page.)

Primary Examiner—John Juba, Jr.
(74) Attorney, Agent, or Firm—Oliff & Berridge, PLC

(57) ABSTRACT

A security device includes a holographic optically variable effect generating structure having at least two discrete section. The sections that generate in response to white light illumination an optically variable image having at least two defined graphical elements located at or near an image plane either on or adjacent to the plane of the device. In response to coherent illumination, the sections generate at least two discrete covert images, in the form of indicia, whose image planes are located at a distance away from the real place of the device. The covert images are reconstructed at different angles to a normal to a substrate supporting the device such that the covert images are spatially separated on their image plane, the covert images being non-visible under white light illumnination.

22 Claims, 4 Drawing Sheets

OTHER PUBLICATIONS

Bjelkhagen Hans I. et al., Selected Papers on Fundamental Techniques in Holography; SPIE Milestone Series; vol. MS 171: pp. 167, 168, (1969).

Brown, Kevin; Holo–puck Halo–print Conference; New Opportunities; What Can We Learn From Tax Banderols: Meeting Demands in Russia; Paper 9; (1999).

Hutley, M.C., Diffraction Gratings, Techniques of Physics; pp. 28–35, 116–119, 162–169, (1982).

van Renesse Rudolf L. et al.; Optical Security and Counterfeit Deterrence Techniques III; Proceedings of SPIE; vol. 3973; pp. 66–77, (2000).

* cited by examiner

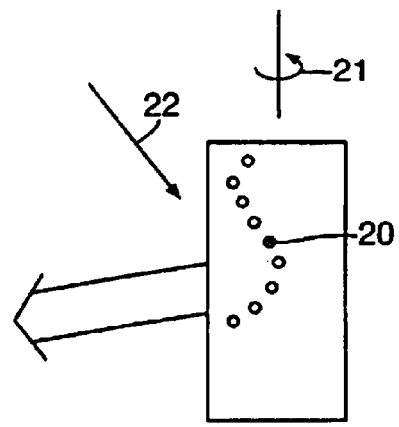
Fig.5.
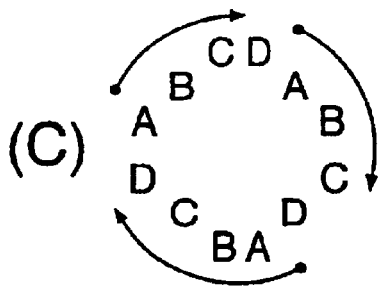
Fig.2.
(A)
(B)
(C)
(D)
(E)
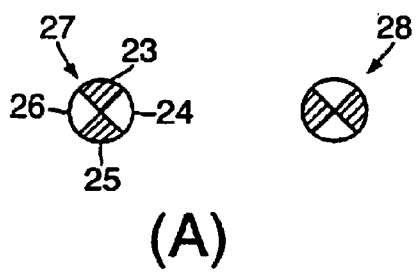
(A)
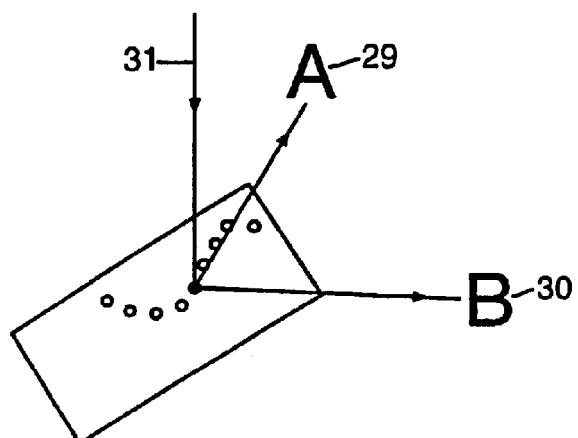
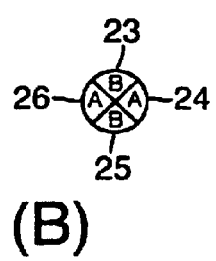
(B)

(A)

(B)

SECURITY DEVICE

The invention relates to a security device for use in securing documents and other articles of value against fraudulent reproduction, counterfeiting and the like.

Many security devices are based on the use of optically variable effect generating structures which generate holograms and the like since these are difficult to manufacture. Examples of such holographic structures and their manufacturing techniques can be found in EP-A-0548142, EP-A-0632767, and WO-A-99/59036 all owned by De La Rue International Limited and the teaching of which and other patents referred to within these documents are incorporated herewith by reference. WO-A-92/09444 is also incorporated as part of the prior art which teaches how to create an improved durability secure and simple to authenticate optical microstructure image feature for visual authentication of a banknote. Certain visual diffraction grating security devices already exist, for example as described in EP-A-0105099 which describes a security device showing an apparent movement effect consisting of areas of plane diffraction grating orientated at different directions along a track each of which diffracts an incident light beam into one particular direction although it should be noted that these are purely diffractive grating devices, with each segment purely a diffraction grating and thus incapable of forming a focused out of plane image under coherent illumination as a covert feature.

In terms of previous machine readable or coherently viewable holographic security structures we would refer to EP-A-0548142 for techniques on how a hologram may create an out of plane image for authentication, although we would point out that in this case the machine readable structure was designed to be completely hidden from visual view to an observer of the hologram and in fact consisted of superposed weak diffraction gratings which did not form a focussed out of plane image. DE-A-3840037 shows an example of a visual security hologram containing a superposed additional laser transmission hologram designed to form an out of plane image to be revealed under laser light with a machine reader or visualiser and designed to be non-recognisable under normal lighting.

There is a continuing need to enhance the security of such security devices while enabling them to be readily authenticated.

U.S. Pat No. 5,825,478 describes a system and method for determining which of a plurality of visually indistinguishable objects have been marked with a covert indicator in which a portion of a surface of each of a first type of objects are provided with a covert holographic indicator which is exposed to be viewed but which is detectable only when illuminated with a coherent reference light of predetermined wavelength.

In accordance with the present invention, a security device comprises a holographic optically variable effect generating structure having at least two discrete sections which generate In response to white light illumination an optically variable image consisting of at least two defined graphical elements located at or near an image plane either on or adjacent to the plane of the device, and which, in response to coherent illumination, generate at least two discrete covert images, in the form of indicia, whose image planes are located at a distance away from the physical plane of the device, the covert images being reconstructed at different angles to a normal to a substrate supporting the device such that the covert images are spatially separated on their image plane, and the covert images being substantially non-visible under white light illumination.

By holographic optical variable effect generating structure we mean, In this context, any diffractive device with the property of forming a first visual localized graphical image near the real plane of the device for visual observation and which also forms an out of plane covert laser verifiable image (instead of the more usual rainbow slit) for viewing under coherent light. Such a structure can only be created by holographic means, or by computer calculation and direct writing of the required fringe pattern of the structure which represents a slower and much more time consuming method of creating such an element.

A particularly useful form of holographic optically variable effect generating structure is one where the replay directions of the visual optically variable image are designed so as to generate an apparent movement effect on tilting the device around a particular axis.

This new holographic security device comprises a structure which generates at least two defined localized optically variable graphical images in the image plane adjacent the structure in response to white light illumination and at least two covert images spaced from the image plane in response to coherent illumination, and located at different angles to a normal to a substrate supporting the device. The covert images will generally be separated by a distance of the order of half their size. Thus, under normal white light illumination, the observer will see a typical optically variable image such as a hologram or diffractive effect consisting of at least two or more parts but under coherent illumination such as laser light, the observer will see two or more different covert images.

These covert images are preferably in the form of graphical elements, logos or alphanumeric characters which may typically be related to the article or document with which the security device is provided. The visual optically variable images are also preferably in the form of small defined shapes or indicia.

In the preferred case, the covert images are visible to the naked eye when reconstructed under coherent laser illumination of the device, although they could also be constructed at a wavelength outside the visible region for machine detection.

In one embodiment, the optically variable effect generating structure generates two or more graphical images or shapes in response to white light illumination which appear to move as the device is tilted. In this context, we distinguish between the apparent three-dimensional appearance of a hologram or the like with a movement effect such as a lateral movement generated by different diffraction angles between elements.

Conveniently, in this embodiment, each element of the holographic optical variable effect generating structure is formed as a single structure with typically a maximum lateral dimension not exceeding 1.5 mm. Preferably, the maximum lateral dimension is not less than 0.5 mm and most preferably in the range 0.5–0.75 mm, there being at least two such elements, replaying different covert images in different directions within the device.

The reconstruction of the covert images can be enhanced by providing a number of pairs or sets (of three or more) of these sections, each member of a pair or set being arranged to generate the same covert image in response to coherent illumination as the other member(s) of the pair or set. In this case, the individual elements must be located sufficiently close to each other that they fall within the diameter of an illuminating, coherent beam in order for the whole covert message to be reconstructed. Typically, the illuminating beam has a diameter of about 2 or 3 mm using a laser pointer or similar device.

In order to increase security both by increasing the complexity of the overall device and in order to conceal the presence of this new holographic optically variable effect generating structure, the optically variable effect generating structure may be located within a set of further optically variable effect generating structures, designed only to produce white light viewable images or effects, wherein the single and further optically variable effect generating structures, on tilting the substrate under white light illumination, cooperate together to generate a moving image effect. Thus, to the unskilled observer, a moving image effect will be observed under white light illumination and only by illuminating the correct set of optically variable effect generating structures with coherent light will he be able to reveal the covert images. Under normal "white light" illumination, it will not be readily apparent to him that there is a difference between all the structures and that additional covert images are contained within the device.

In another embodiment, the optically variable effect generating structure sections are formed as discrete spaced areas.

As with the first embodiment, pairs or sets of these areas may be provided to enhance reconstruction of covert images and each area may typically have a maximum lateral dimension not exceeding 1.5 mm. Preferably, the maximum lateral dimension is not less than 0.5 mm and most preferably in the range 0.5–0.75 mm.

This second embodiment is particularly useful when the structure generates an image in response to white light illumination which moves as the device is tilted. This combination of features is particularly difficult to reproduce but easy to authenticate.

The holographic optically variable effect generating structure exhibiting the out of plane covert images exists as a holographic structure containing two image planes, a visual image plane for white light viewing and an out of plane image plane viewable by illuminating the device with coherent light.

The shape of these discrete sections, preferably graphical elements, is required to form a focus very near to the surface plane of the hologram whereas the information encoded within them forms a focus (or images) sufficiently far in front of this surface plane as to require coherent, for example laser, illumination to view and therefore verify it. Each graphical element when illuminated with said light source will replay its particular information element in a specific and unique angular direction such that when the complete laser verifiable feature is viewed in its imaging or focal plane, each information element has its own well defined and separate viewing zone or area.

For example, the covert images may define a machine readable pattern such as a bar code, each graphical element corresponding to a respective part of the bar code.

In some cases, the discrete sections all have the same simple geometrical shape which is not related or borrowed from the graphical composition of the main holographic image, for example circles (dots), squares or rectangles. However, the area of these said graphical elements should not exceed 3 mm$^2$.

In other cases, the graphical elements may be concealed from the observer by being fully integrated into the main holographic image design. This is achieved by first selecting a minor (as regards its area) but otherwise complete graphical element or entity that forms part of the holographic image design—preferably a graphical design element that is repeated as part of a kinetic or lenticular movement sequence and subdividing that graphical element into two or more discrete parts. Into each of these said graphical parts will be holographically encoded one unit of the information that comprises the laser verifiable feature.

Typically, graphical elements in the form of indicia such as alphanumerics and the like are used.

Preferably, the optically variable effect generating structure is formed as a single continuous structure. However, the elements could be defined by separate sub-structures with spaces between them which do not diffract light. In this case, the elements could be formed in separate steps.

Typically, the device can be incorporated into a security hologram or a secure optical microstructure (e.g. hologram, kinegram, pixelgram, dot matrix structure, stereogram etc.). In this case, preferably the part of the structure which additionally responds to coherent illumination has a grating frequency less than the part of the structure which forms solely a white light viewable image or effect.

Alternatively, it could be used as a stand alone security optical microstructure where only a small area was available, such as a banknote thread, where this feature could provide both public recognition animation or apparent movement and a unique additional covert laser viewable security device. A particularly useful application for this new feature is as an additional public recognition, the covert images allowing public recognition, and security device for application onto banknotes, and potentially other documents of value where the optical microstructure is applied to a non-smooth or non-flat paper substrate, as the technique revealed here provides considerably greater resistance for the laser verifiable structure to paper roughness and crumple than previously known techniques because it is localized over a small area. Applications for the securitisation of branded goods plastic financial cards as an anti-counterfeit security device are also anticipated.

Another possible application of this device would be as a laser verifiable trademark type symbol. For example, many security holographic originations could contain the same apparently simple public recognition feature incorporated into one area, either as a set of dots or graphics providing a simple visual apparent movement effect (e.g. a set of 2 lines of 3 dots moving towards each other tilting) which would become a standardized feature but which under laser coherent illumination could replay entirely different laser viewable messages only revealed under coherent illumination. This could be applied as an upgrade to all forms of security holograms and security diffraction grating devices such as dot matrix devices and more specialised techniques such as the Kinegram (OVD Kinegram Corp.) and the Exelgram (Commonwealth Scientific Industrial Research Organisation (CSIRO), Australia) which would be applied to all forms of security documents and security labels, including those used for brand protection applications and for banknote applications such as threads within paper and holographic stripes and patches applied to paper and other items and substrates.

A particularly useful potential application could be for the window thread, commonly used in banknote and other security papers where although holographic threads are available the area of view in each window strongly restricts the degree of security that can be incorporated into the holographic image. This small window area rill available to reveal a visual image thus making it hard to produce both a simple effective public recognition visual security device and also to incorporate additional optical security in terms of machine readable or laser readable images. This invention would allow a thread to contain a simple publicly verifiable switching or moving pattern (potentially, however, reasonably straightforward to imitate with a dot matrix pattern)

which could also replay a secure covert laser verifiable feature. Likewise this feature could be incorporated into a repeated dot or graphic pattern on a banknote stripe or patch to increase the security of banknote optical microstructures as the technique revealed here is much more resistant to crumple, paper roughness and other degradation in use than previously disclosed features.

Another useful but slightly different use of this type of improved machine verifiable device would be as an improved security device on a banknote, building on the teaching of WO-A-92/09444. A useful more secure form of public recognition security device for a secure hologram used on a banknote is to use repeated elements as in WO 92/09444, but instead of treating these in pairs replaying a multiply repeated simple switching image, using one or both of these holographic elements to provide an apparent movement effect, (e.g. a run or rotation) which would be harder to counterfeit for a holographic laboratory and would also provide a useful holographic public recognition animated feature. Within this run of repeated elements, which could be apparently non-overlapping or slightly overlapping to provide for example, a simulated 3D depth effect, or simulated enlarging effect on tilting, some or all of these elements could contain laser verifiable features as revealed in this technique, which would have improved durability and viewable under relatively simple coherent illumination conditions using a laser pointer for example.

Another advantage of preferred embodiments of this invention is that they provide potentially an additional third layer of security check for the security device distinct from that available with prior systems. The first layer of security is the animated visual image produced for visual viewing potentially as part of the security hologram design. The second layer of security is the presence of the covert laser verifiable message, simply revealed even by a relatively unskilled observer using a simple coherent light source, such as a laser pointer and a viewing screen. An additional third level of security would then come by analysing the replay angles and possibly fold planes of the laser viewable image. This could be done for a more sophisticated security check using either a laboratory device or a laser based machine reader or viewer device designed to identify the geometry of replay of the laser verifiable features more precisely then would be possible using the simple laser pen method to provide an additional characteristic security check.

Some examples of security devices according to the invention will now be described with reference to the accompanying drawings, in which:

FIG. 2 illustrates various images which could be produced using the technique shown in FIG. 1;

FIGS. 5A and 5B illustrate a second embodiment under white light and laser light illumination respectively; and;

Figure 1:
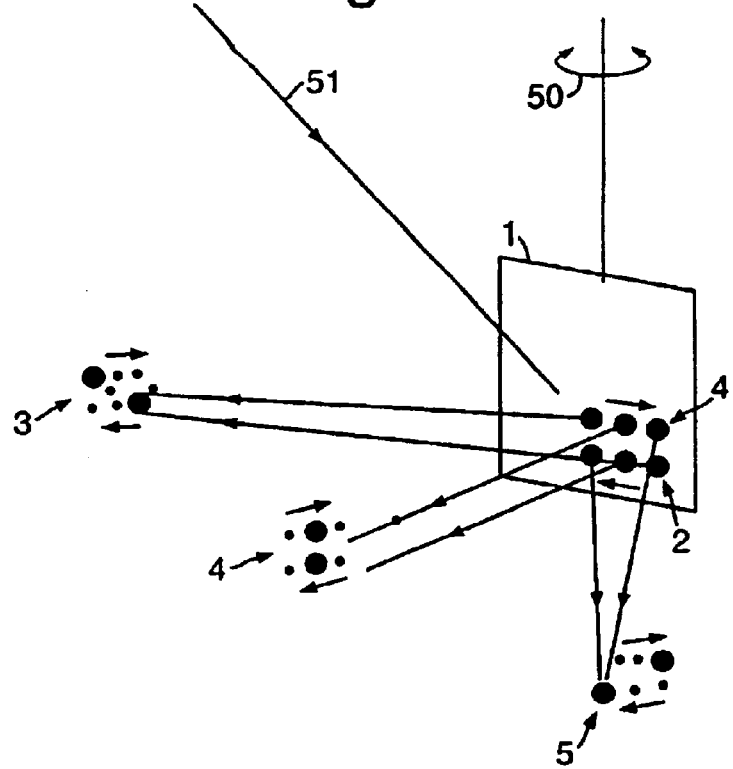
FIG. 1 is a schematic illustration of a first embodiment of the device under white light illumination.

In the first embodiment, the device has been combined into an embossed rainbow hologram for a security application.

A standard rainbow, embossed security hologram 1 (FIG. 1) optionally containing other holographic security features (not shown) has 6 extra dots 2 incorporated into one area of the design, in this case designed as a reasonably distinct area. In this case small dots were used (in the range 0.25 mm to 1 mm diameter) although a set of graphics or other symbols such as text of a word could have been used. On tilting 50 the hologram, in this case from left to right, under white light or normal ambient illumination 51 the holographic replay from the dots is designed so they appear to move relative to each other in a very specific way, in this case the 6 dots were organised into 2 lines of 3 and 3 imaging pairs of dots. The direction of the holographic replay from the dots has been organised so that the dots appear to move together and apart on horizontally tilting the hologram from left to right, as shown schematically at 3–5 representing different tilt angles. This apparent movement provides an animated public recognition diffractive feature with images being close to the surface of the device.

FIG. 2 illustrates a variety of other types of image which could be used instead of plane dot images as in FIG. 1. In these examples, sets of letters are provided, the letters appearing in sequence as the device is tilted. That sequence may be rectilinear (FIGS. 2A and 2B), in the form of a rotation (FIG. 2C), in the form of an expansion, in other words successive letters appear further out from a central point (FIG. 2D), or in a repeated form as shown in FIG. 2E.

In the preferred example, at least three replay directions will be used as shown in FIG. 1 and typically three or more pairs or sets of dots or graphics with each member of a pair replaying in the same direction, will be a useful minimum requirement to form an effective public recognition security device as well as to give effective laser replay and some durability to damage on any particular area and some degree of ease of alignment for laser replay.

The second element of this new security feature is visible only under laser illumination, and in this case we have designed the laser viewable covert features to be very easily verified by an unskilled authenticator simply by illuminating 6 (FIG. 3) the feature with a diode laser pointer or laser pen or similar and using a very simple viewing screen 7 to visualise the out of plane replay of the covert graphical image, although of course a specific machine reader i.e. an authenticator box, could be constructed. However, an advantage of this system is that it provides an improved clarity replay for the out of plane feature (described below) and enables very simple authentication of the laser viewable feature using a very simple, low cost technique such as a commercially available laser pointer and simple viewing screen to image the covert feature. The viewing screen 7 could just be a sheet of paper. Each element of the device, when illuminated with coherent laser light, reconstructs out of the white light image plane a real image of the corresponding covert feature, usually much larger than the element size (e.g. element diameter 0.75 mm, real image size at 250 mm away approximately 25 mm, at 100 mm away approximately 15 mm). The small spatial extent of each element aids in the non-viewability of the feature except when illuminated by a coherent beam.

Figure 3:
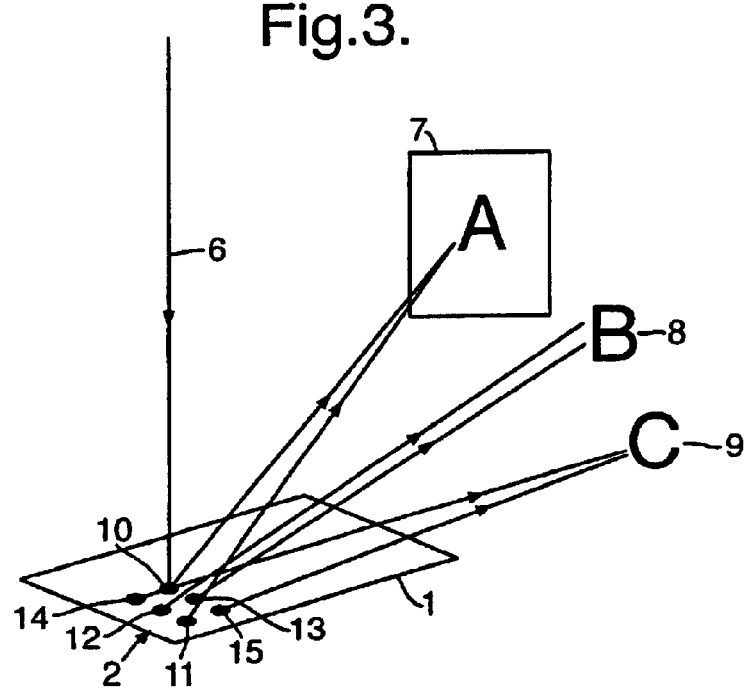
FIG. 3 illustrates the first embodiment under laser illumination.

As can be seen in FIG. 3, the six dots 2 are arranged in pairs, each pair contributing to the reconstruction of a respective covert image 7–9. The dots 10,11 form a first pair reconstructing the image 7, dots 12,13 form a second pair reconstructing the second covert image 8, and dots 14,15 form a third pair reconstructing the third covert image 9.

Since these covert images 7–9 are formed out of the normal image plane and at a distance from the device where they are focused, they are normally invisible to a viewer under ordinary white light.

Conveniently, the dots 2 are positioned sufficiently close together that they can all be illuminated within the diameter of a single laser beam which will typically be 3 mm.

Note that in contrast to previous systems, because the individual laser viewable features are localised in small areas on the substrate the cone angle of light reconstructed to form the image is small—this gives a very wide depth of field for forming an approximately focused laser viewable image and enables the image to be viewed on a screen relatively close (approximately 50–75 mm if required) to the substrate to give a high brightness feature whilst the narrow angle of view and small image plane area keep the laser viewable image well hidden. This contrasts with other known laser viewable systems where the covert image is distributed over a larger area where the compromise to keep the image close to the medium and reasonably bright is that the hidden image becomes easily viewable under a spotlight and, because a wide range of replay angles are required for a near plane image, significantly degrades any holographic image it is superposed onto whilst the technique disclosed here completely localises the laser readable feature and thus completely avoids degrading any other aspects of the associated security hologram.

Note that in the preferred embodiment each elemental laser verifiable feature of the holographic optically variable effect generating structure is a hologram displaying 2 different images at 2 different focal planes, one (white light image) is the focal plane near or at the plane of the display hologram where the elemental feature is focussed to show a visually recognisable graphical feature to an observer viewing the hologram, while the second focal plane is where one might normally visualize the projected "rainbow slit" in an embossed rainbow hologram. In the present case the elemental holograms under coherent laser illumination reconstruct a simple graphical feature such as a letter or shape—this hidden laser verifiable out of plane feature only being visible under coherent (laser) illumination and is otherwise non visible to an ordinary observer under so called 'white light' illumination conditions such as a spot light, room lighting or daylight.

Importantly the replay characteristics from each individual graphical element of the covert images is nearly indistinguishable from the colour replay characteristics of either a simple diffraction grating element or a simple lenticular holographic feature (i.e. a feature replaying a very short rainbow holographic slit approximating in visual terms to an observer to the characteristic replay of a pure diffraction grating) which makes the colour replay and apparent movement characteristics of the laser verifiable area almost indistinguishable from a standard holographic movement feature. This thus serves effectively to conceal the presence of the additional laser light readable verifiable message. This is in strong contrast to earlier known laser verifiable holographic features as seen in the commercial art. These other systems use a number of methods inferior to the new system described here, which has a number of distinct and important advantages over previous techniques. Some previous methods superimpose the laser verifiable (or machine verifiable) image over the whole hologram or a large area of the hologram thus degrading the visual image by producing what appears to be a "noise" replay at a certain angle. These systems also tend to replay under coherent light a less clear laser viewable image partly because the distributed image is much more prone to disruptions by paper roughness (e.g. for hot stamping foils) or to surface undulation (e.g. for labels) which cause a blurring of the out of plane image because of the small angular changes in image reconstruction direction caused by the non flatness of the substrate. Often also the machine readable features if localised into an area of the hologram or diffractive structure design are very noticeable because of the relatively large amount of information stored in the laser verifiable feature producing a large replay angle and a diffused as matt white reconstructed image colour in comparison to more saturated diffracted colours, rendering the presence of an additional feature obvious. This often results in feature degradation through manufacturing due to the wide bandwidth of spatial frequencies in this area producing non-linearities and replay problems and noise in the final devices—this relatively large amount of information stored by other systems tends to require a large number of different superposed spatial frequencies that tend to compete resulting in fringe competition, medium saturation so resulting in a less effective laser verifiable feature with increased noise. These manufacturing issues do not cause a problem in this new system as each element of the laser viewable message has been separated out into individual small areas containing a limited number of spatial frequencies much more similar to that in the holographic areas, guaranteeing ease of manufacture and minimising manufacturing degradation during embossing.

In contrast to these previous systems the laser verifiable system revealed here has several distinct advantages as follows:

Firstly each individual laser verifiable element in the revealed system is localised into small areas (e.g. a dot), this means that distortions on the reconstructed image due to lack of substrate flatness or paper roughness are minimised so providing a higher quality laser visualised image with less degradation and noise due to surface irregularities more simply verifiable with coherent illumination.

Secondly, each laser verifiable element only contains a single simple graphic (e.g. a letter) as a laser verifiable feature as a component of the whole message. This keeps each individual laser viewable feature's microstructure as simple in terms of spatial frequency bandwidth as possible (i.e. minimises number of spatial frequencies to minimise fringe competition). This reduction in the spatial frequency bandwidth required allows a visual feature replay in white light that appears virtually indistinguishable from a diffraction grating feature as it gives a substantially saturated colour replay (not a diffused colour replay) and this also allows the feature to emboss more effectively and be less susceptible to noise picked up during the embossing process due to medium saturation which appears more quickly for a lower brightness for more complex optical microstructures.

Thirdly, the localisation of a simple graphic into each laser verifiable spot but then the use of different spots replaying at very different directions for other characters in the message again makes the feature more robust to lack of surface flatness and microscopic surface roughness as it enables individual characters in the laser viewable feature to be well separated angularly and spatially to avoid overlap.

Fourthly, an advantageous arrangement of the laser verifiable spots or graphics is to use a distance between the graphical features such that a typical laser pen spot size only illuminates one feature carrying each laser viewable character at any one time so ensuring the clearest possible laser viewable feature for each character by avoiding slightly different angles of reconstruction possible if multiple elements corresponding to the same laser readable character were illuminated, whilst the repetition of the laser verifiable elements in sets or pairs facilitates ease of alignment and easy readability without precise alignment by ensuring that, for example in a non limiting applications, one of each type of laser verification character is illuminated at any one time for readout and also means that each laser viewable feature is repeated at least once to make the overall feature more durable against local crumple, degradation or surface scratches for example, thus providing improved laser verification for aged or crumpled labels or documents such as banknotes.

This new system is also more secure than the prior art in terms of being better disguised as a machine readable feature within a security hologram and also in terms of being more difficult for an organisation skilled in holographic or diffractive processes to counterfeit as well as having the role as a public recognition diffractive security feature. The explanation for these advantages are as follows. The feature is better disguised within a security hologram because firstly it replays a purer diffractive colour than other previous laser viewable features and thus appears very similar to other surface diffractive gratings and lenticular features within a hologram and so the set and presence of laser verifiable features is effectively disguised. The feature can also be additionally disguised within a security hologram either within a design or as a spatially separated area as a set of features or graphics providing a public recognition apparent movement feature displaying to a viewer on tilting the hologram e.g. a rotation, form change, image switch or linear movement effect, for example. Thus this new security feature acts as a public recognition device by the nature of the apparent movement features possible inherent in the technique used of angularly separating the laser verifiable replay into separate distinct directions attributed to separate spatially distinct areas.

FIG. 5 illustrates a second embodiment in which the security device is provided as a single structure 20 in the form of a dot, that structure being formed as part of a line of dots defined by surface grating features in the form of lenticular racing stripes. As the device is rotated 21 under white light illumination 22, the surface grating features including the device 21 cooperate together to provide a moving dot display. The device 20 itself is formed in four sections 23–26 which are constructed in pairs 23,25 and 24,26 so that they provide a switching pair of images as shown at 27,28 as the device is tilted under white light illumination.

In addition, each sector 23–26 is also constructed so that it will replay a respective covert image 29,30 under laser illumination 31. As can be seen in FIG. 5B, the pair of sectors 23,25 form the covert image 30 and the pair of sectors 24,26 form the covert image 29.

In some cases, the device 20 could be used by itself.

The creation of the elements of the machine readable feature during the optical microstructure manufacturing stage is also more difficult than for previous devices as it requires creating several separate focused graphics at or near the image plane of the visual hologram replaying in several distinct diffractive directions ideally to provide an apparent movement effect or form change effects on tilting and also creating along these replay directions a separately focusable laser viewable image only viewable with coherent light. The origination of this feature would typically be achieved using conventional holographic processes typically the H1 to H2 set up and then instead of using a short rainbow slit to project an elemental image the rainbow slit is instead shaped into the form of the laser viewable graphical element devised. This would then be repeated for each of the several graphical elements, each pattern incorporating several movement features and a minimum of two separate laser verifiable features, preferably more, a useful number is 3 or more pairs or sets of separate graphics or dots as this is at the level of complexity of creation and complexity of laser verifiable features where other techniques start to suffer from degradation and is also useful number of separate features useful for creating a recognisable and reasonably complex visual public recognition movement feature as part of the visual display hologram or other diffractive security devices as appropriate.

This is a useful anti-counterfeit feature against potential counterfeits using commercially available so called "dot matrix" machines which expose a photoresist substrate to two interfering laser beams to form a point grating then moving the pattern stepwise between exposures to generate an array of gratings written under computer control in a step and repeat manner (commercially available mchines and in the literature from e.g. Dimensional Arts and Ahead Optoelectronics Inc.). The new security device revealed here is a useful anti counterfeit devise against such dot matrix systems as the device revealed here enables a superficially simple public recognition visual holographic device, where the visual pattern displays a simple moving feature for straightforward public recognition, to have significantly increased covert laser verifiable security visualised very simply to a knowledgeable inspector by using a laser pointer and simple screen to reconstruct and verify the laser visualised message. In this case, although the visual movement feature may be counterfeited by a dot matrix pattern the out of plane laser visualised features for coherent viewing could not be duplicated by a dot matrix system which could only provide a pure diffractive grating replay (in this case a preferred form of the visual graphic for the laser viewable feature would be as a dot or continuous graphic, as any attempt to duplicate both this and the laser viewable feature with a dot matrix system would be prohibitively difficult as it would require breaking the individual graphic into discontinuous dots each replaying at different directions to duplicate the laser visualised features, although this would be extremely if not prohibitively difficult in terms of spatial and angular resolution for almost all existing dot matrix systems. This would also be very difficult to reproduce for other security imaging techniques based on diffraction gratings, such as those based on recombination of standard grating patterns such as the "Kinegram", or those based on electron beam writing techniques such as the "Exelgram", and the levels of control and sophistication should be well beyond most conventionally equipped holographic laboratories as this device would normally be one component of a secure holographic image containing many other features.

In the preferred approach, the device is holographically originated into photoresist to form a surface relief pattern suitable for electroforming a metal shim form for later manufacture by embossing. The holographic origination could use a variation on the known Benton type H1–H2 process to form a surface relief hologram where this device is optionally combined with a 2D/3D or 3D hologram or stereogram or any other diffraction grating or diffractive security device as known in the art. When the laser verifiable feature is reconstructed using coherent laser illumination, the graphical information of which it is comprised comes to a focus or is imaged onto the same plane as Benton rainbow slits that are similarly reconstructed when the visible host hologram is illuminated by the same source of coherent light.

The surface relief hologram would then be copied by known electro-plating processes as known in the art to form metal copies and thence holographic embossing shims that could be used to emboss the device by the known replication method of holographic or diffractive embossing for optical microstructures. The devices would then be incorporated into labels, tamper evident labels, hot stamping foils and other like materials used for the mass replication of optical security features which would then be affixed to security documents, plastic cards and articles of value.

One aspect that is normally involved and advantageous in the use of this current invention is that the laser verifiable feature of this invention when recorded as part of a security hologram or diffraction grating or the like is usefully always of a diffractive carrier grating spatial frequency that is less then that of the holographic fringe structure. This is advantageous in reading out the laser verifiable feature using a laser pointer or similar source as low cost laser sources are almost invariably (today) red colour wavelength laser devices, in that the laser verifiable feature will diffract the red laser light through a smaller angle than the visual holographic structure, thus angularly separating the laser verifiable feature from the visual security hologram to make viewing of the laser verifiable feature easier. So it is advantageous for ease of authentication to record the laser viewable feature in a coarse diffractive structure (i.e., a smaller spatial frequency carrier grating) then the accompanying visual holographic feature so that it conveniently diffracts the usually red laser light used for readout through a smaller angle than the visual hologram to ensure angular separation. This technique of using a coarse diffractive grating for the covert (e.g. machine verifiable) feature means that it is often the least dispersive element on the security device which helps to minimises image blur on reconstruction due to small variations in the angles diffracted by different areas of the device due to substrate roughness. So the use of this smaller diffractive angle for the laser verifiable feature ensures that the diffracted replay from the laser verifiable feature diffracted replays are least degraded by substrate roughness of all the components of the holographic or diffractive security device.

Figure 4:
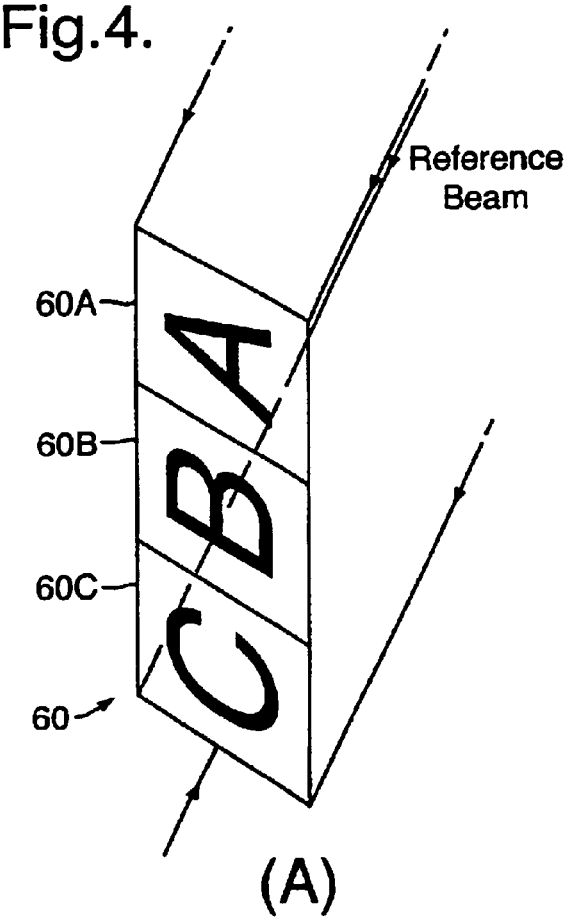
FIG. 4 illustrates the production of a structure for use with the first embodiment.
Figure 4:
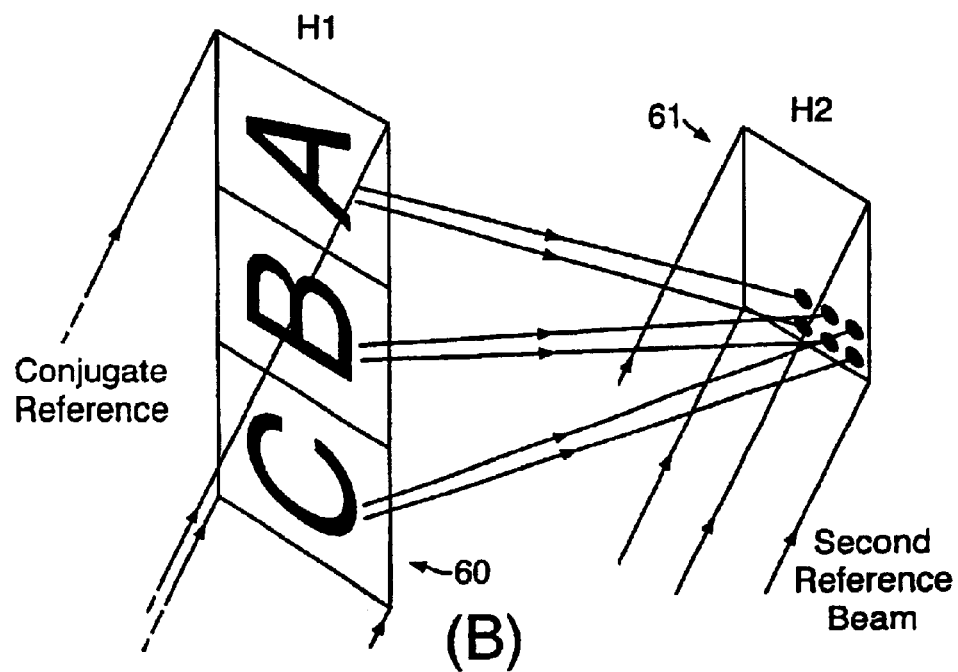

With reference to FIG. 4 one method to incorporate this additional machine readable feature would be to record a second independent H1 60 (FIG. 4A) corresponding to the various areas of artwork for the laser verification feature, say 3 areas of artwork recorded into 3 areas 60A,60B,60C of H1 with instead of the usual H1 rainbow slit masking techniques being used, the areas of the H1 being masked in the shape of the desired laser verifiable feature. This H1 60 could then be used in the well known H1–H2 sequence to transfer the laser verification image to the image plane of the H2 hologram 61 (FIG. 4B). This would then create an H2 hologram usually in photoresist containing the visual image plane laser verifiable feature animated as per the directions of diffraction as defined by the initial H1 design as the laser verifiable feature. Use of a smaller reference beam angle than on any accompanying visual security hologram or diffractive security device would ensure the laser verifiable feature was recorded at a coarser diffraction grating pitch that the visual diffractive security devise. Subsequently this image could be combined with a visual security hologram by recording a second H2 hologram onto the photoresist from a separate Hi corresponding to the visual security image required. Subsequently the photoresist plate would be developed in the usual way to form a surface relief hologram. Other origination techniques are also probable such as the creation of a single complex composite H1 containing all the elements of both the visual hologram and the laser verification areas recorded in separate areas with one single transfer recording step for the H2 hologram.

Other alternative and equally viable techniques for originating the laser verifiable feature and 2D/3D security holograms could include the use of masks to define visual image graphic features on the image plane hologram ad the use of appropriately shaped masked diffused or lenticular diffusing sheets to form the object beam with the addition of a separate reference beam as known in the art.

Another image manufacturing technique would be to make a single master hologram of the laser verifiable feature, copy this onto a metal master by electroforming and then to use mechanical recombination techniques (i.e. selective flat bed embossing of areas) to incorporate this feature within a security hologram, or pure diffractive device such as a Kinegram and Exelgram to upgrade the security on these devices.

Note also that although the most common usage of this technique will be as surface relief embossed optical microstructure such a laser verifiable feature as revealed here could be used in a volume holographic security device using such recording materials as silver halide emulsions, dichromated gelatin and holographic photopolymers (e.g. as produced by E.I.Dupont, Holographics Division and Polaroid Corporation, Holographics Division) using reflection Holography as known in the art (e.g. G. Saxby, "Practical Holography", Prentice Hall).

In this case the origination and manufacturing techniques would in detail be different. However, the principle of creating an improved coherent laser light viewable covert feature for multiple small graphics used also to produce an apparent movement effect for public recognition would remain valid. i.e. the use of several holographic elements having both a visual image plane graphical image for visual authentication as a shape or graphic and having also a graphic shape in an out of plane feature forming a laser verifiable covert feature viewable only under laser light.

Figure 6:
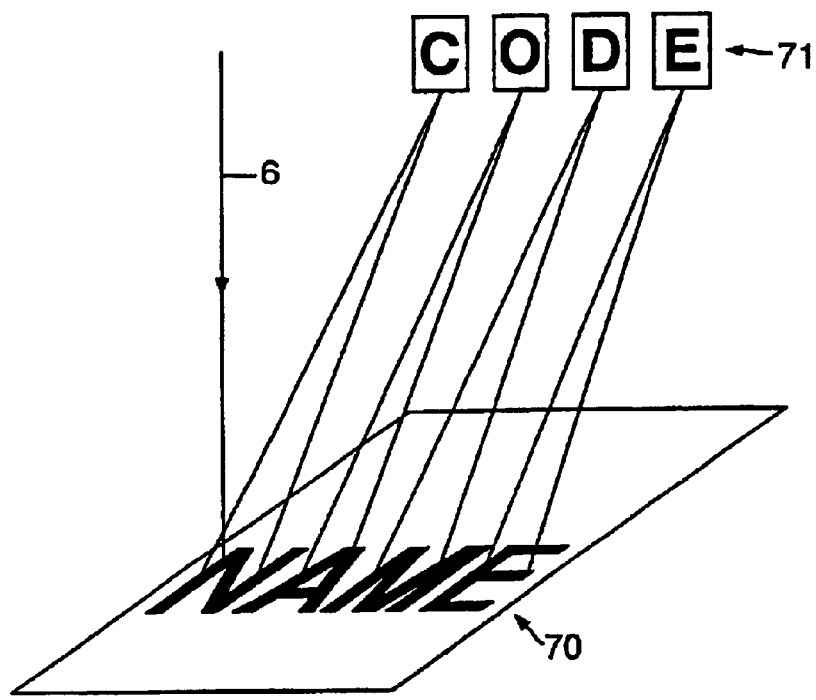
FIGS. 6 and 7 are schematic views, similar to FIG. 3, of further examples of devices under laser illumination.

In the examples described so far, the security device replays a number of small dots under white light illumination. FIG. 6 illustrates an example in which the structure 70 replays graphical indicia, in this case the letters NAME, under white light illumination, typically in sequence as the device is titled, while under laser illumination 6 covert indicia CODE are reconstructed as shown at 71 in a different plane.

Figure 7:
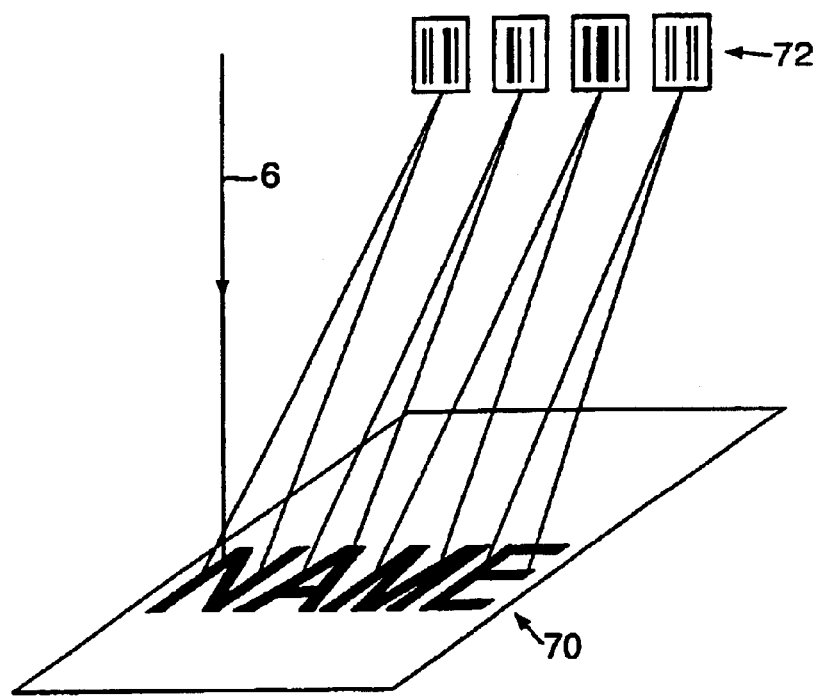

FIG. 7 is a modified example corresponding to FIG. 6 in which under laser illumination, a bar code 72 is reconstructed as the covert image under laser illumination. Each section of the structure which generates a letter N A M E under white light illumination, corresponds to a respective part of the barcode 72.

What is claimed is:

1. A security device comprising a holographic optically variable effect generating structure having at least two discrete sections, wherein each section generates, in response to white light illumination,
   a) an optically variable image consisting of at least one defined graphical element located at or near a first image plane either on or adjacent to a plane of the device, and
   b) at least one discrete covert image, in the form of indicia, in a second image plane located at a distance away from a physical plane of the device such that the at least one discrete covert image is substantially non-visible to the observer;
   and wherein each section generates, in response to coherent, visible illumination,
   a) the optically variable image, and
   b) at least one discrete covert image, the at least one discrete covert image being visible to the observer in the second image plane,
   the at least one discrete covert image from each of the at least two discrete sections being reconstructed at different angles to a substrate supporting device such that the covert image from each of the at least two discrete sections are spatially separated on the image plane.

2. A device according to claim 1, wherein the optically variable effect generating structure generates an optically variable image in response to white light illumination which moves as the device is tilted.

3. A device according to claim 1, wherein the optically variable effect generating structure is formed as a single continuous structure.

4. A device according to claim 3, wherein each element of the holographic optically variable effect generating structure has a maximum lateral dimension not exceeding 3 mm.

5. A device according to claim 4, wherein each element of the holographic optically variable effect generating structure has a maximum lateral dimension not exceeding 1.5 mm.

6. A device according to claim 3, wherein a number of pairs or sets of at least three of said sections are provided, each member of a pair or sets being arranged to generate the same covert image in response to coherent illumination as the other member(s) of the pair or set.

7. A device according to claim 3, wherein the single holographic optically variable effect generating structure is located within a set of further optically variable effect generating structures, wherein the single and further optically variable effect generating structures, on tilting the substrate under white light illumination, cooperative together to generate a moving image effect.

8. A device according to claim 1, wherein the optically variable effect generating structure sections are formed as discrete spaced areas.

9. A device according to claim 8, wherein the device includes a number of pairs or sets of said areas, each member of the pair or set having substantially the same construction.

10. A device according to claim 8, wherein each area has a maximum lateral dimension not exceeding 3 mm.

11. A device according to claim 10, wherein each area has a maximum lateral dimension not exceeding 1.5 mm.

12. A device according to claim 1, wherein the optically variable effect generating structure is a security hologram in the form of a diffraction grating or holographic structure.

13. A device according to claim 12, wherein the part of the structure which responds additionally to coherent illumination has a grating frequency less than the part of the structure which responds to white light illumination.

14. A device according to claim 1, wherein the optically variable effect generating structure is a surface relief structure.

15. A device according to claim 1, wherein the covert images comprise graphical elements, alphanumeric characters, logos, or machine readable patterns such as bar codes.

16. A device according to claim 15, wherein each section generates a covert image defining part of the machine readable pattern.

17. A device according to claim 1, wherein the sections have substantially the same shape.

18. A device according to a claim 1, wherein the sections have a simple geometrical shape, the geometrical shape includes at least one of a circle, a square or a rectangle.

19. A device according to claim 1, wherein the sections are shaped as graphical indicia.

20. A device according to claim 19, wherein the sections define alphanumeric characters.

21. A device according to claim 1, wherein the device has been holographically originated through a Benton-type H1 to H2 transfer arrangement.

22. A document or article of value carrying a security device according to claim 1.

* * * * *